Figure 1:
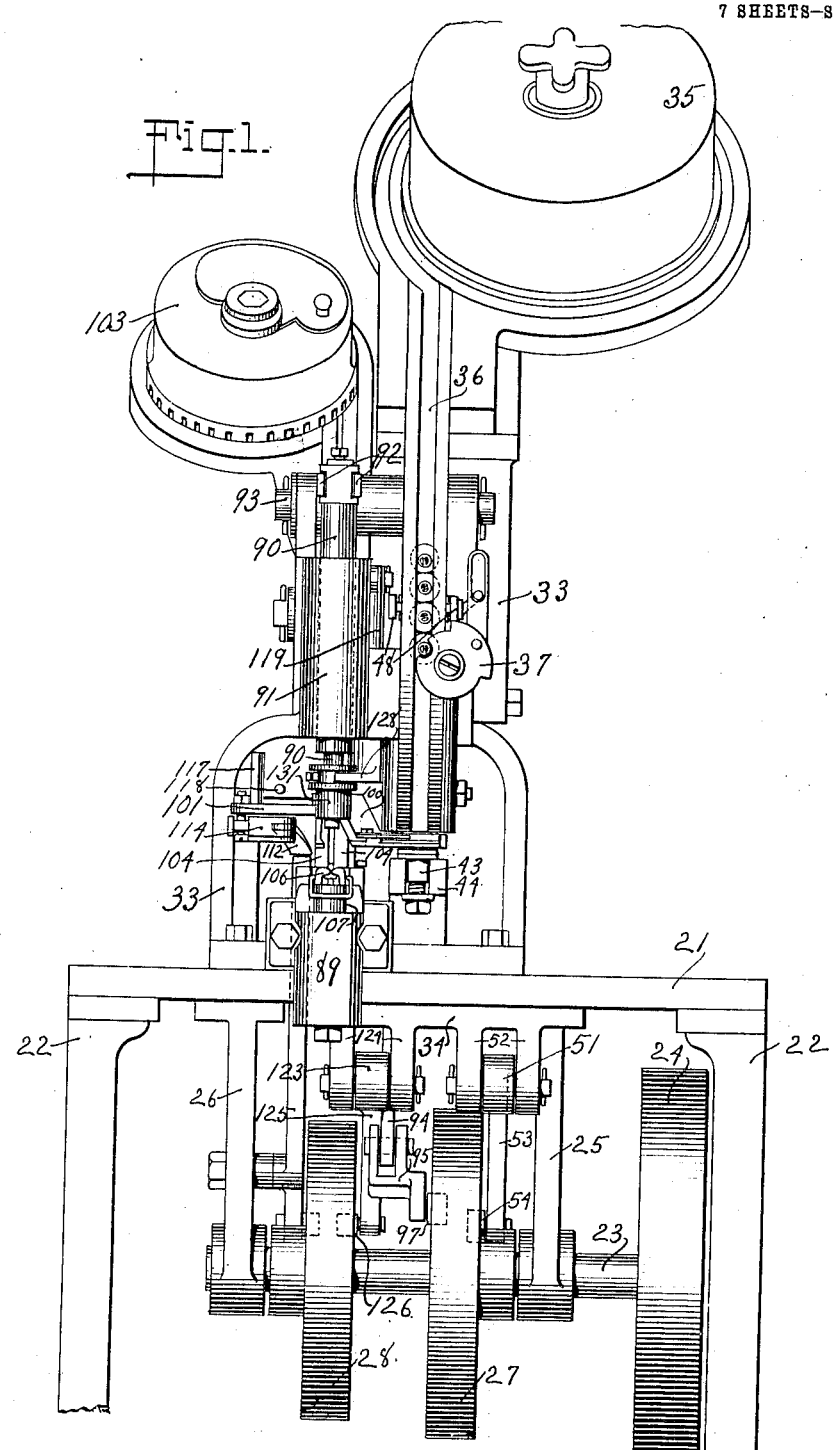

F. R. WHITE.
BAR BUTTON ATTACHING MACHINE.
APPLICATION FILED MAY 10, 1913.

1,085,185.

Patented Jan. 27, 1914.
7 SHEETS—SHEET 1.

F. R. WHITE.
BAR BUTTON ATTACHING MACHINE.
APPLICATION FILED MAY 10, 1913.

1,085,185. Patented Jan. 27, 1914.
7 SHEETS—SHEET 3.

Fig. 3.ª

F. R. WHITE.
BAR BUTTON ATTACHING MACHINE.
APPLICATION FILED MAY 10, 1913.
1,085,185.
Patented Jan. 27, 1914.
7 SHEETS—SHEET 4.
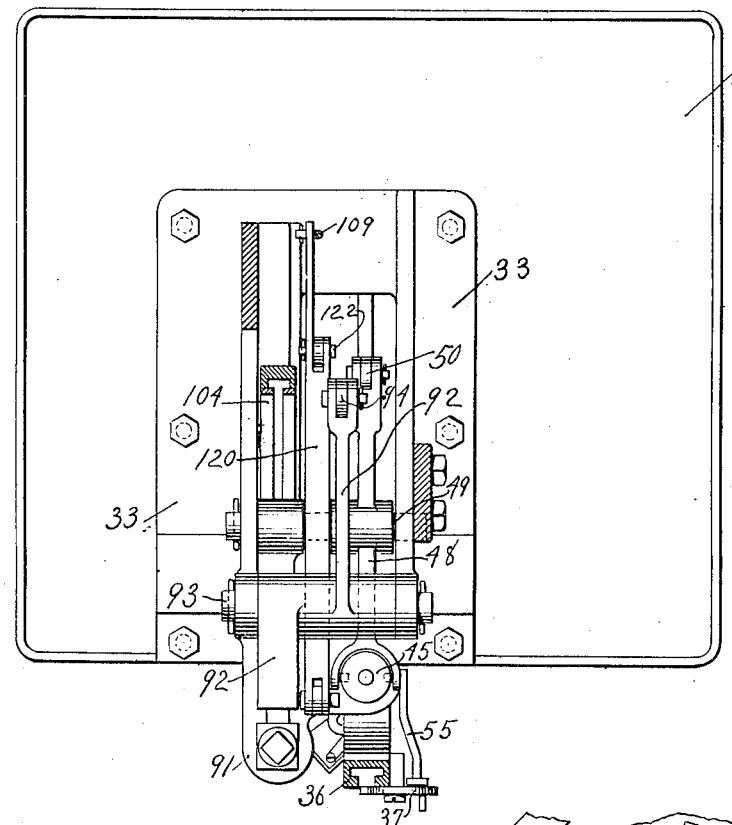
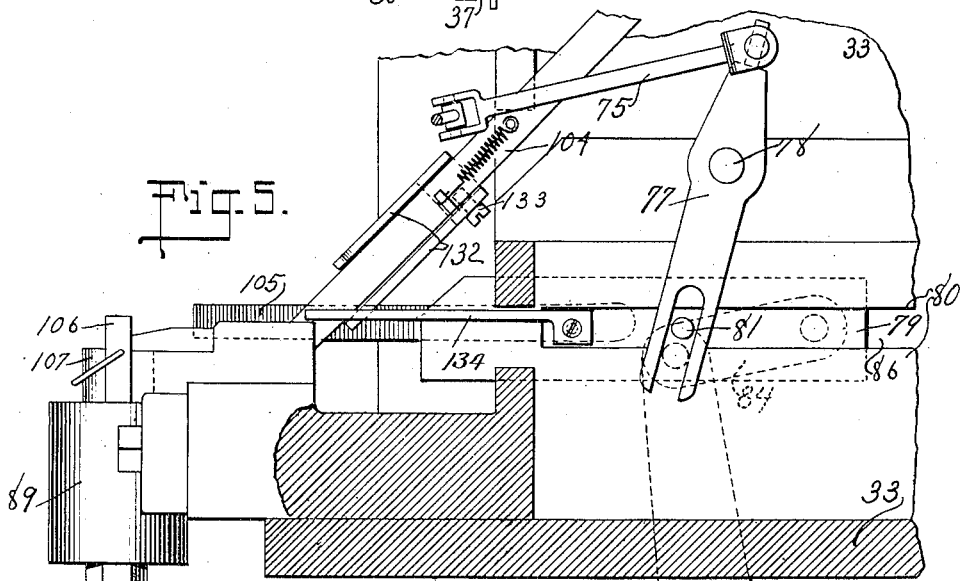

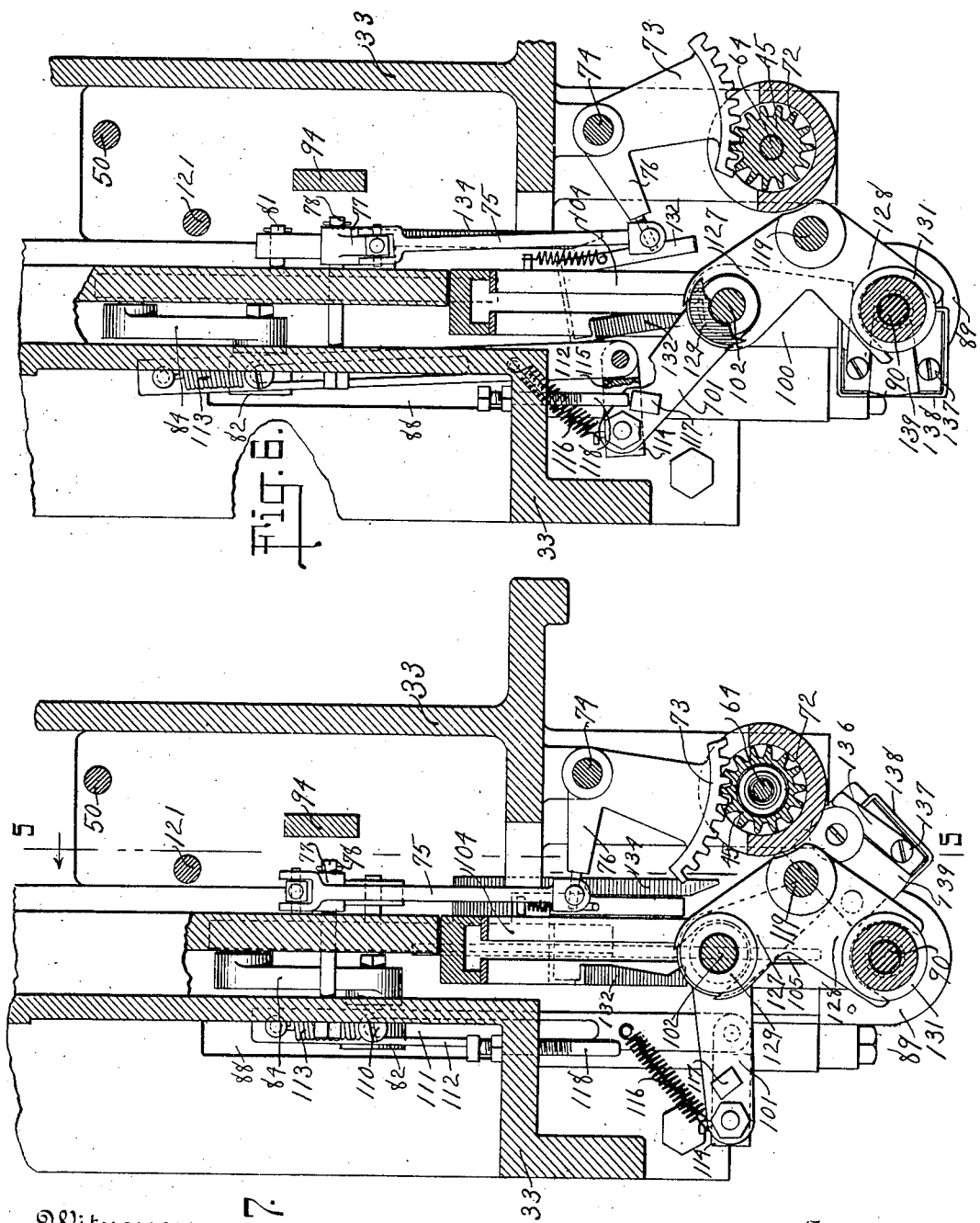

F. R. WHITE.
BAR BUTTON ATTACHING MACHINE.
APPLICATION FILED MAY 10, 1913.
1,085,185.
Patented Jan. 27, 1914.
7 SHEETS—SHEET 6.
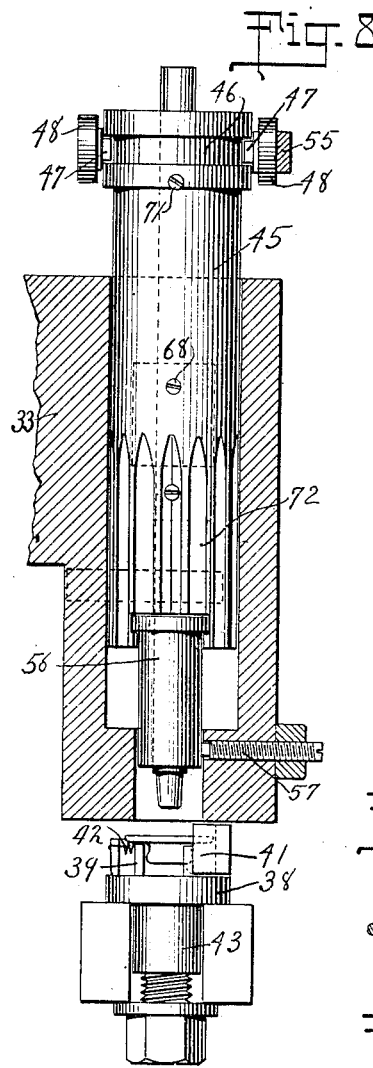
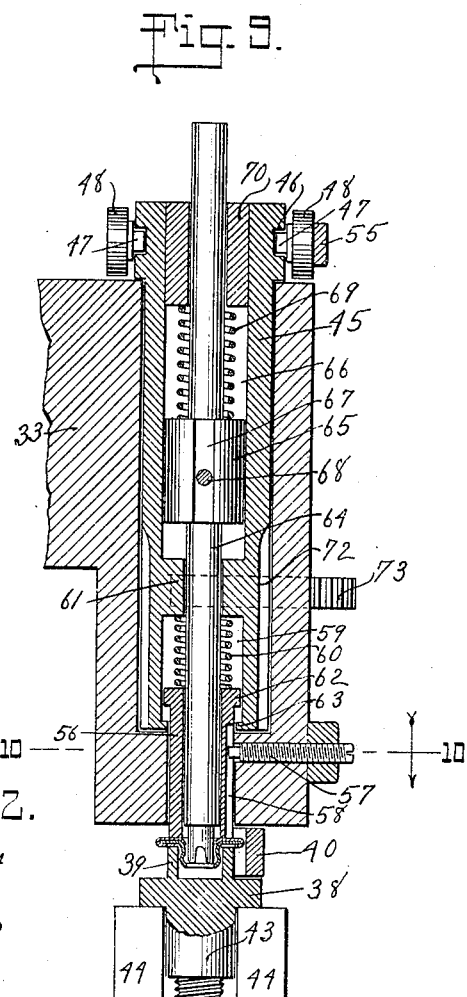
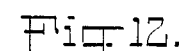
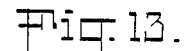
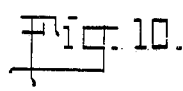
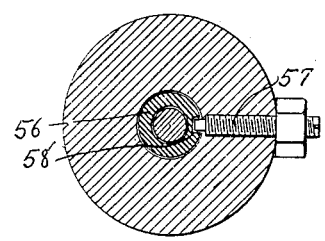
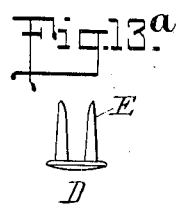
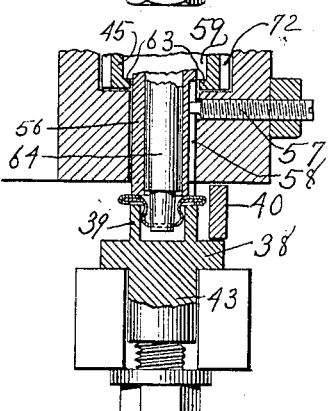

F. R. WHITE.
BAR BUTTON ATTACHING MACHINE.
APPLICATION FILED MAY 10, 1913.
1,085,185.
Patented Jan. 27, 1914.
7 SHEETS—SHEET 7.
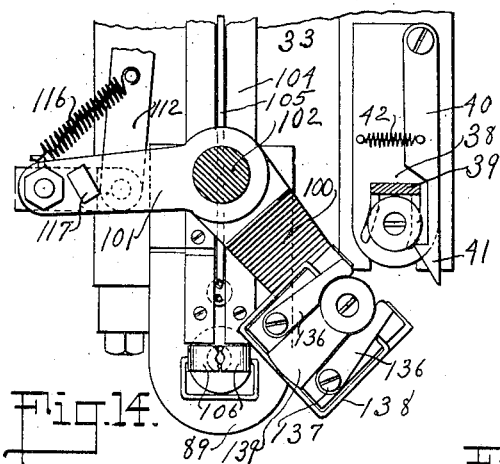
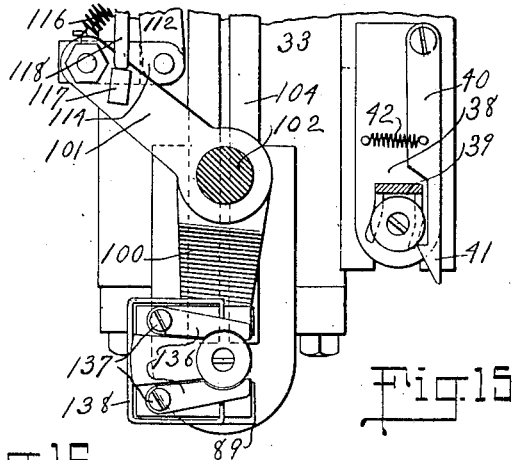
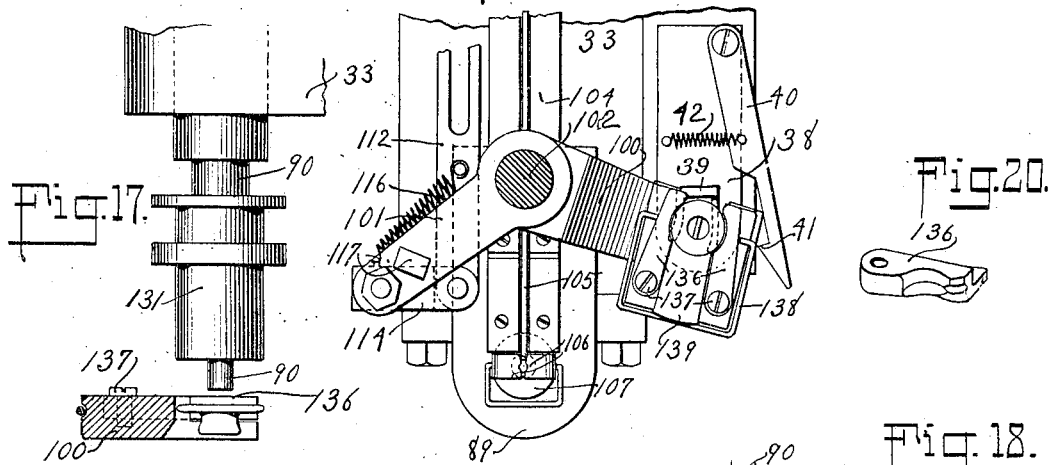
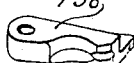
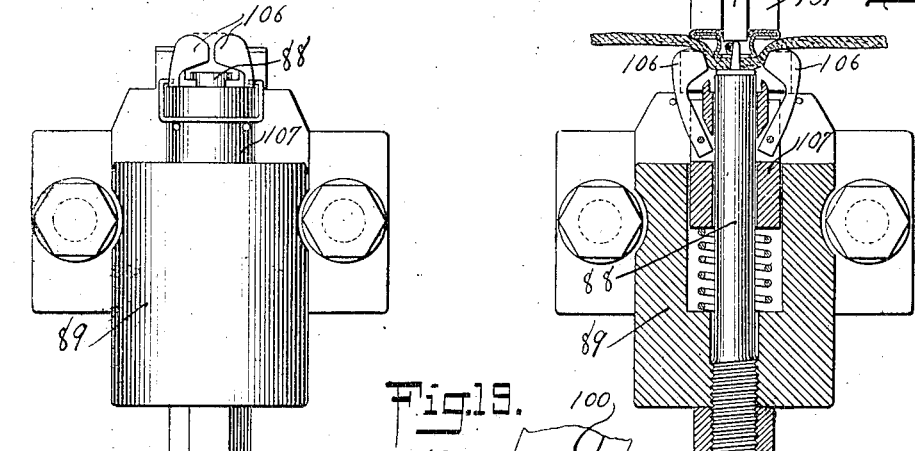

UNITED STATES PATENT OFFICE.

FRANKLIN R. WHITE, OF WATERTOWN, CONNECTICUT, ASSIGNOR TO PATENT BUTTON COMPANY, OF WATERBURY, CONNECTICUT, A CORPORATION OF CONNECTICUT.

BAR-BUTTON-ATTACHING MACHINE.

1,085,185.   Specification of Letters Patent.   Patented Jan. 27, 1914.

Application filed May 10, 1913. Serial No. 766,710.

*To all whom it may concern:*

Be it known that I, FRANKLIN R. WHITE, a citizen of the United States, and a resident of Watertown, in the county of Litchfield and State of Connecticut, have made and invented certain new and useful Improvements in Bar-Button-Attaching Machines, of which the following is a specification.

My invention relates to button attaching machines of the type designed to secure buttons to a fabric or garment by means of a suitable two-pronged fastening staple, the prongs of which are bent or clenched to secure engagement between the button and staple and thus fastening the button in place; and the principal object of my invention is to provide a machine with which buttons having a transverse cross bar about which the prongs of the fastening staple are clenched, may be used, although certain of the features of my machine are equally advantageous in machines designed to operate with or upon other types of buttons.

In the use of buttons having a cross bar it is obvious that the cross bar of the button must extend at right angles to the plane of the prongs of the fastening staple at the time that the button is secured to the garment in order that the prongs may straddle the cross-bar of the button and be properly clenched about the same; and a further object of my invention is to provide a button attaching machine in which the fastening staples and the buttons will be automatically so positioned relative to one another that the prongs will come one upon each side of the cross bar as the button is secured in place.

With the above and such other and further objects of invention as will hereinafter appear in view, my invention consists in the improved button attaching machine illustrated in the accompanying drawings and hereinafter described and claimed, and in such variations and modifications thereof as will be obvious to those skilled in the art to which my invention relates.

Figure 2:
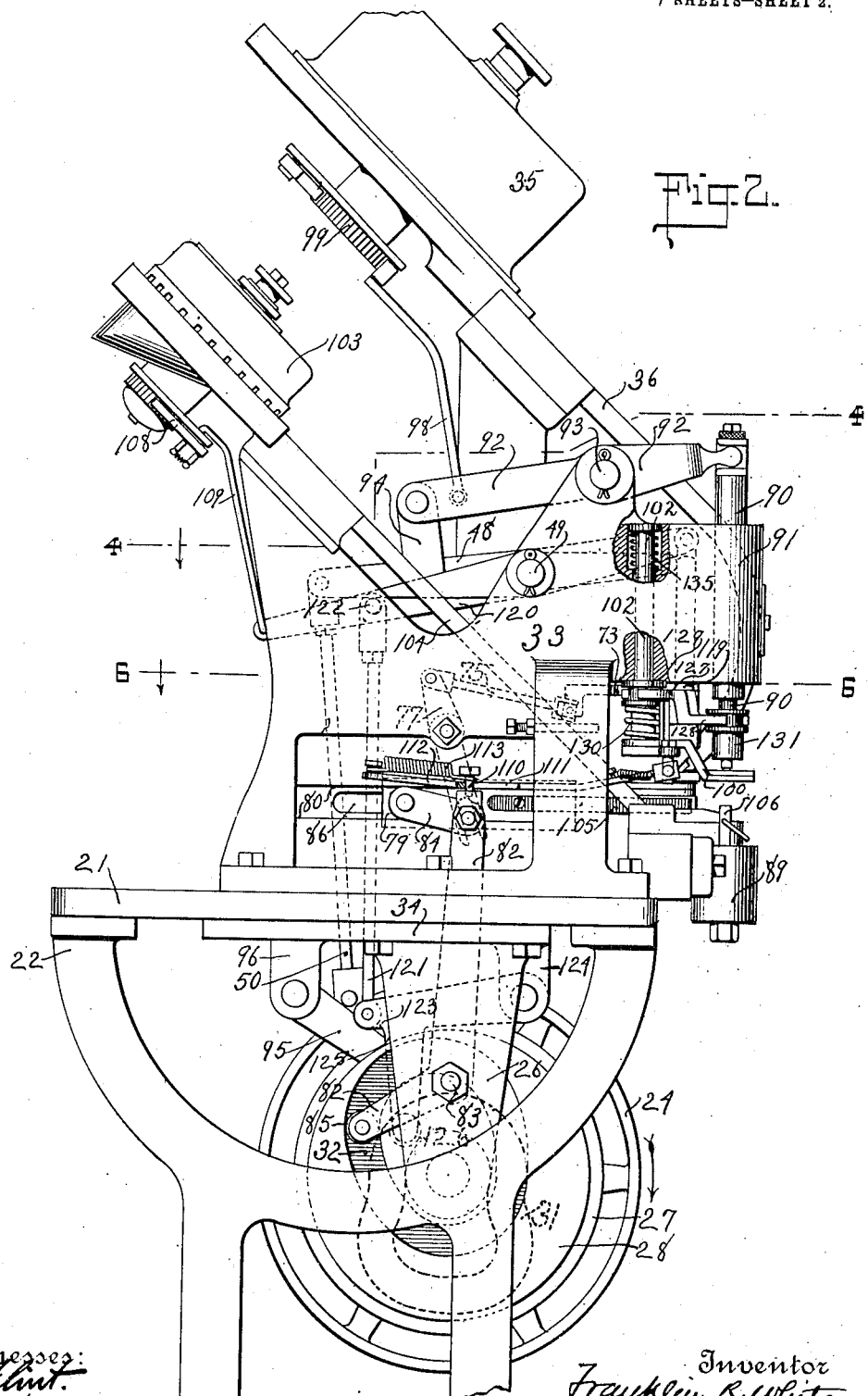
Figure 3:
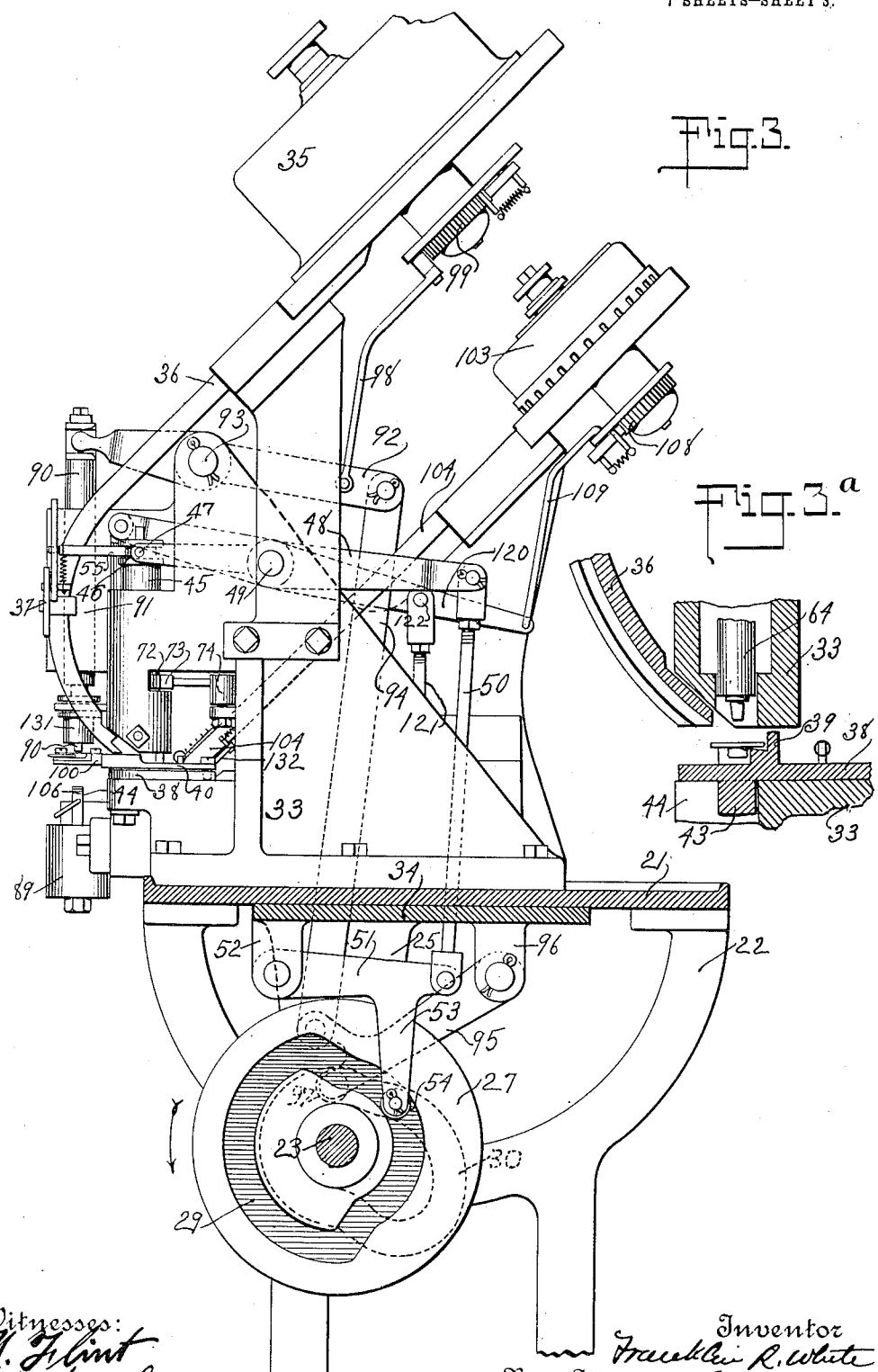

Figure 1 is a view showing my improved button attaching machine in front elevation; Fig. 2 is a view showing the same in side elevation as seen from a position to the left of Fig. 1; Fig. 3 is a similar view of the machine as seen from a position to the right of Fig. 1; Fig. 3ª is a fragmentary view showing a detail of my machine; Fig. 4 is a view showing a section taken upon a transverse horizontal plane indicated by the line 4—4, Fig. 2, looking down; Fig. 5 is a view upon a larger scale and showing a portion of the machine upon a vertical central plane indicated by the line 5—5, Fig. 7; Fig. 6 is a view drawn to about the same scale as Fig. 5, and showing a portion of the machine upon a transverse horizontal plane indicated by the line 6—6, Fig. 2 looking down; Fig. 7 is a similar view showing the parts in another position; Fig. 8 is a view showing certain button receiving and positioning mechanism forming a part of my machine; Fig. 9 is a similar view showing the parts in section; Fig. 10 is a view showing a section upon a transverse plane indicated by the line 10—10, Fig. 9; Fig. 11 is a view showing some of the parts shown in Fig. 9 in another position; Fig. 12 is a view showing the button upon which my machine is designed to operate in section, and illustrating the operation of an element of the machine thereupon; Fig. 13 is a view showing the button in plan; Fig. 13ª is a view showing the form of two-pronged fastening staple designed to be used with my machine; Fig. 14 is a fragmentary view illustrating the operation of certain button transferring mechanism forming a part of the machine; Fig. 15 is a similar view showing the same parts in another position; Fig. 16 is a similar view showing the same parts in still another position; Fig. 17 is a fragmentary view illustrating the position of certain parts of the machine as seen in elevation, when the position of the corresponding parts when shown in plan is as is illustrated in Fig. 15; Fig. 18 is a fragmentary view illustrating the operation of the machine in securing a button to a garment; Fig. 19 is a fragmentary view showing a detail of an element of the button transferring mechanism in perspective; and, Fig. 20 is a view showing a button grasping jaw in perspective.

Referring to the drawings wherein the preferred embodiment of my improved button attaching machine is illustrated, the reference character 21 designates a base or table which serves as a support for the various parts which constitute my improved button attaching machine, and which base is supported by means of legs 22; and 23 designates the main driving or operating shaft from which the several mechanisms hereinafter referred to are operated in proper sequence relative to one another, the said shaft being shown as operated by means of a driving pulley 24 although it may be remarked that a clutch is commonly provided through which motion is transmitted to the main driving shaft, to thereby permit the machine to be readily started or stopped by the operator.

The driving shaft is supported in bearings at the lower ends of suitable brackets or hangers 25, 26 shown as depending from and formed integrally with a plate 34 which in turn is secured to the under side of the table 21. The driving shaft carries two cam disks 27, 28 each of which is provided with two cam grooves or raceways formed one in each of the sides of each disk, and which raceways are designated by the reference numerals 29, 30, 31 and 32, Figs. 2 and 3, the raceways 30 and 31 appearing in dotted lines in said figures, because they are formed in the faces of the cam disks 27 and 28 opposite from the faces appearing in said figures. The cam grooves or raceways are for the purpose of operating the various mechanisms included in and which collectively constitute the specific form of my machine illustrated and hereinafter described in detail in proper sequence relative to one another, as will appear, and it is obvious that the form of said raceways or cams may be varied so long as the proper sequence of operation of the parts is maintained; and that each cam race may be formed in a separate disk, or may be replaced by a cam having a driving periphery of a form suitable for the end in view as distinguished from a cam formed by a raceway provided in the side of a disk.

Supported by and extending above the base or table 21 is a frame 33 which serves as a support for the various elements and mechanisms which collectively form my improved button attaching machine, which frame may be made in one or any suitable number of parts, and the form or shape of which may be varied within wide limits so long as it serves the purpose or end in view of supporting the several elements of the machine in proper relation to one another, and in such a way as to permit their movement in accordance with the predetermined mode of operation and function of the concrete machine.

Figs. 12 and 13 illustrate the form or type of button which my button attaching machine is designed to operate upon and secure to a garment by means of a two-pronged staple of the form shown in Fig. 13ª, the button having a head A, a hollow hub B, and a cross-bar C at the lower end of said hub, about which cross-bar the prongs E of the securing staple are bent in the act of securing the button to the garment or other fabric, as will be understood from Fig. 18.

The buttons are fed from a rotary button feeding hopper 35 down a button chute 36 past a button escapement 37 by means of which they are released separately and pass one by one to a button receiving member 38 supported from the frame of the machine, and which member is designed to receive and hold temporarily the separate buttons supplied to it from the lower end of the chute 36, as will be understood from Fig. 3ª. The button receiving member is provided with a socket or recess formed by an upwardly extending wall 39, which recess is open at the top and front so that buttons may pass into it, and be removed therefrom by a lateral movement, as will hereinafter appear.

The buttons are fed to the button receiving member right side up, see Figs. 3ª, 14, 15 and 16, and are held in place within the recess or socket thereof until removed therefrom, as will hereinafter appear, by means of a pivotally supported latch member 40 having a hook 41 at its free end, which hook extends above the top of the button as it rests within the recess or socket, as best shown in Figs. 8 and 9. The hook member is held in the position shown in Figs. 14 and 15 by means of a spring 42. The button feeding hopper 35, chute 36, and escapement 37 may be of any suitable form as the particular features of said elements form no part of the invention to which this application relates. The button receiving member 38 is preferably secured to a flat surface of the frame of the machine as by means of a threaded stud 43 upon its under side, which stud extends through a slot formed in a projecting bifurcated lug 44, see Figs. 1 and 3, in order to provide for a limited amount of adjustment of the said receiving member relative to the lower end of the button chute and relative to the button transferring mechanism whereby the buttons are removed from the button receiving member, as will hereinafter appear.

It is obvious that the buttons within the button chute 36 will be arranged promiscuously with reference to the direction in which their cross-bars extend, as shown in Fig. 1, and that the cross-bar of a button, after it has passed into the recess or pocket of the button receiving member may extend in any direction. At the time when the button is secured to the garment, however, the cross-bar of the button must extend at right angles to the prongs of the two-pronged attaching staple in order that the prongs may straddle and may be bent around the said bar, as shown in Fig. 18. I therefore provide button positioning means for rotating each button about its axis, after it has reached the button receiver and before it is removed therefrom, to thereby bring the cross-bar of the button into a definite predetermined angular position; that is to bring the cross-bar into a definite plane, or so that it will extend in a definite and predetermined direction, the preferred form of such means being as follows:

The reference numeral 45 designates a reciprocating and oscillating sleeve member movable vertically and operable in a bearing provided in the frame of the machine as best shown in Figs. 8 and 9. The upper end of said member is provided with a circumferentially extending groove 46 into which two pins 47 at the free forward end of a bifurcated oscillating lever 48 extend, see Fig. 3. This lever is pivotally supported from the frame of the machine at 49, and 50 is a link connecting the rear end of said lever with the free end of a second lever 51 pivotally supported in arms 52 depending from the plate 34. The lever 51 is provided with an arm 53 intermediate its ends which arm carries a roller 54 at its free end, which roller operates in the cam groove or raceway 29 above referred to. It will therefore be obvious that reciprocating motion is communicated to the sleeve member 45 through the elements above referred to, as the driving shaft 23 is rotated.

The reference numeral 56 designates a yieldable spring pressed reciprocating button engaging sleeve, the lower end of which is adapted to engage a button within the recess or socket of the button receiving member 38 as best shown in Figs. 9 and 11 and thereby steady the button as it is turned about its axis, as will hereinafter appear. This steadying sleeve is guided in a bearing provided in the frame of the machine, and is prevented from rotating by a screw 57 the inner end of which enters a slot 58 provided in said sleeve. The upper end of said steadying sleeve extends into a chamber 59 in the lower end of the sleeve member 45, the walls of said member being cut away as shown in Fig. 8 to permit the parts to be assembled, and 60 is a spring acting between the upper end of the steadying sleeve 56 and an internal ledge 61 of the sleeve member 45 and acting to force the said sleeve downward. The downward movement of the sleeve 56 is limited by a projecting flange 62 at its upper end which engages with inwardly extending lugs 63 at the lower end of the member 45. It will therefore be obvious that as the sleeve member 45 is moved downward, as above explained, the lower end of the steadying sleeve 56 will be moved into contact with a button within the button receiver 38 and the spring 60 compressed upon further downward movement of said member, the button being thus held between the lower end of said sleeve and the upper end of the wall 39 of the button receiver.

The button positioning member includes a longitudinally extending button turning rod or member 64 located within the sleeve 45 and the lower end of which extends through and below the lower end of the steadying sleeve 56, and is bifurcated, and the arms of which may straddle the cross-bar of the button as shown. This button turning member is provided with a collar 65 operable in a chamber 66 provided in the sleeve member 45, which collar is provided with a slot 67 into which the end of a screw 68 extends so that the said turning member may move longitudinally independently of the member 45, but is rotated with said member when the same is rotated as will hereinafter appear. A spring 69 surrounds the upper portion of the member 64 and acts between the collar 65 thereof and a sleeve 70 which surrounds the rod 64 and forms a guide therefor, and which sleeve is secured within the upper end of the chamber 66 as by means of a screw 71; the purpose of which spring is to permit the button turning member to yield in case the bifurcated end is brought into contact with the cross-bar of a button within the button receiver as the member 45 is moved downward, as distinguished from in a position such that the bifurcated end of said member straddles or may slip over the cross-bar.

The sleeve member 45 is provided with an elongated pinion 72 at its lower end formed preferably by cutting a series of elongated teeth in its peripheral surface, and the reference numeral 73 designates an oscillating toothed sector pivotally supported from the frame of the machine at 74, and which sector is in mesh with the elongated pinion 72 at all times notwithstanding the reciprocating movements of the sleeve member 45, as will be understood from Figs. 6, 7, 8 and 9. Motion is communicated to the toothed sector 73 through a pitman 75, one end of which is operably connected with an arm 76 of the sector and the other end of which is pivotally connected with the upper end of an oscillating lever 77, see Figs. 2, 5, 6 and 7, pivotally supported from the frame of the machine 78. The lever 77 is operated from a reciprocating cross-head 79 sliding in guides 80 formed in the frame of the machine, which cross-head carries a pin 81 extending through a slot 86 in the frame, and which pin is straddled by the two arms of the bifurcated lower end of the said lever, as shown in Figs. 2 and 5. The reciprocating cross-head 79 is operated by an oscillating lever 82 pivotally supported from the hanger 26 at 83, and the upper end of which lever extends through a slot 87 in the frame and is operably connected with the cross-head through a link 84. The second arm of the lever 82 carries a roller 85 at its free end which roller operates in the cam groove or raceway 32 above referred to. It will therefore be obvious that as the main driving shaft is rotated, reciprocating motion will be communicated to the cross-head 79, and that the sleeve member 45 will be oscillated about a vertical axis by mechanism above referred to and described. The lever 48 carries an arm 55 which operates the button escapement 37 through suitable connecting mechanism, as best shown in Fig. 3, the details of which mechanism, however, form no part of the invention to which this application relates.

The reference numeral 88, Fig. 18, designates the staple supporting anvil of the machine. This anvil is shown as supported by a bracket 89 carried by the frame 33 of the machine, and the reference numeral 90 designates a reciprocating button setting punch movable in a bearing 91 formed in the frame of the machine and the lower end of which is reduced in diameter and adapted to engage the points of the two-prong fastening staple and bend them about the cross-bar of a button to thereby secure the same to a garment, as will be understood from Fig. 18. The button setting punch is operated by means of a lever 92 pivotally supported from the frame of the machine at 93 and the forward end of which lever is in operative engagement with the upper end of said punch; the lever being operated by means of a pitman 94 the upper end of which is pivotally connected with the rear end of said lever and the lower end of which is pivotally connected with a lever 95 supported from the plate 34 by depending arms 96 and the free end of which last mentioned lever carries a roller 97 operating in the cam race 30 of the disk 27, see Fig. 3.

Two-prong fastening staples having a head D and pointed prongs E, as shown in Fig. 13ª, are fed to the anvil 88 with their prongs extending upward, as shown in Fig. 18, from a rotary staple hopper 103 through a staple chute 104. The staple chute is provided with a suitable staple escapement 132 for releasing the staples one by one, the same being pivotally secured to the staple chute at 133; and said escapement is operated by a reciprocating operating arm 134 carried by the cross-head or slide 79, see Figs. 5 to 7. The lower end of the staple chute terminates adjacent the upper end of the anvil 88 as will be understood and as best shown in Figs. 2, and 14 to 16.

The reference numeral 105 designates a reciprocating staple feeding member the purpose of which is to push individual staples from the lower end of the chute 104 and onto the upper end of the anvil whereby they will be held in position by spring-pressed jaws 106, see Fig. 14, which jaws are carried by a spring pressed collar 107 surrounding the anvil, as shown in Fig. 18, so that the jaws may yield as the button is secured to the garment, as will be understood. The staple feeding member 105 is secured to and consequently moves in unison with the cross head or slide 79 hereinbefore referred to, see Fig. 2. The staple hopper 103 is rotated through ratchet mechanism 108 and a pitman 109 pivotally connected with the lever 120; and the rotary button hopper 35 is operated from the lever 92 through a pitman 98 and suitable ratchet mechanism 99. These ratchet mechanisms are not disclosed in detail as the same forms no part of the invention to which this application relates.

The button positioning mechanism above referred to is so designated and arranged that each separate button is rotated into such a position that its cross bar C, after the button has been transferred to a position above the anvil 88 as will next appear, will extend across or transverse to a vertical plane extending through the prongs of the fastening staple, as will be understood from Figs. 14 and 15; so that as the button is moved downward one prong will lie upon each side of the cross bar as shown in Fig. 18; and, after the button has been positioned as aforesaid, it is grasped by the button transferring mechanism and removed from the button receiving member 38 and carried into a position above the upper end of the anvil 88 and over the staple resting thereupon, and then moved downward to bring it into contact with the garment to which it is to be secured and into a position such that the prongs of the staple may be bent about the cross-bar of the button by the button setting punch 90 as above explained.

The button transferring mechanism above referred to is shown enlarged in Figs. 14 to 16 and as comprising a lever having a jaw carrying arm 100 and an operating arm 101, the said lever being secured to the lower end of a vertically movable and oscillating supporting and guide member 102 supported in a vertically extending bearing provided in the frame of the machine as best shown in Fig. 2; and which supporting and guide member is held in its normal uppermost position by means of a spring 135. The purpose of this construction is to permit the jaw carrying arm to be moved about the axis of the guide as a center to receive a button from the button receiving member 38 and to carry the button into a position over the anvil 88, and to permit the said arm to be then moved downward to bring the button close to or into contact with the garment to which the button is to be attached; the garment being held in position over the anvil as will be understood from Fig. 18 of the drawing.

Oscillatory movement is transmitted to the arm 101 from the lever 82, see Fig. 2, hereinbefore referred to, through a pin 110 operating in a slot 111 of a reciprocating pitman 112, the pin being connected with the pitman through a spring 113; so that if the jaw carrying arm 100 engages the button receiver, see Fig. 16, before the end of the movement of the upper end of the lever 82 toward the right, the spring may yield and thus prevent injury to the parts. The right hand end of the pitman 112 is connected with the arm 101 through a link 114 pivotally connected with the arm and with the pitman. This link has a stop or abutment at 115 in engagement with the pitman; and 116 is a spring connecting the pitman and link, and which spring will obviously hold the abutment in contact with the pitman, as shown in Fig. 6. The arm 101 carries a lug 117 which engages a fixed adjustable stop 118 when the button has been moved into its proper position over the anvil, as shown in Fig. 15; after which the spring 116 will yield during the further movement of the upper end of the lever 82, see Fig. 2, toward the left, should any such movement occur, thus preventing injury to the parts.

After the button has been moved into a position over the anvil it is moved downward by means of a reciprocating slide 119 operating in a vertically extending bearing formed in the frame of the machine and the upper end of which is operatively connected with the forward end of a lever 120 pivotally supported at 49, said lever being operated through a pitman 121 the upper end of which is pivotally connected therewith at 122 and the lower end of which pitman is pivotally connected with the free end of a lever 123, the other end of which lever is supported in depending arms 124 carried by the plate 34. The lever 123 has an arm 125 which carries a roller 126 at its free end operating in the cam groove 31 of the cam disk 28. It will therefore be obvious that reciprocating motion is communicated to the slide 119 through the mechanism above described. Located at the lower end of the slide 119 are two arms 127, 128 the free ends of which are bifurcated as best shown in Figs. 6 and 7. The free end of the arm 127 engages a circumferentially extending groove formed in a collar 129 movable upon the guide 102 above referred to, and 130, see Fig. 2 is a spring surrounding the said guide and interposed between the collar and the button transferring lever made up of the arms 100 and 101, and through which spring the button transferring lever and the button carried by the arm 100 is moved downward into contact with and pressed with a yielding pressure against the garment to which it is to be attached, as the slide 119 is moved downward, it being understood that the spring 130 is stiffer than the spring 135. The free end of the other arm 128 at the lower end of the slide 119 engages a circumferentially extending groove formed at the upper end of a reciprocating button holding member 131 surrounding and movable upon the lower end of the button setting punch 90, the lower end of which member engages the top plate of the button and holds it in firm contact with the garment while the prongs of the fastening staple are being bent about the cross-bar of the button by the punch, as will be understood from Fig. 18.

The jaw carrying arm 100 of the button transferring mechanism is bifurcated at its free end, as shown in Fig. 19; and the same is provided with means for grasping the button within the button receiving member, as shown in Fig. 16, and for holding the button so that it cannot change its position while it is being moved into a position over the anvil 88 as shown in Fig. 15. This button grasping means is shown as comprising two jaws 136 pivotally secured to the free end of the arm at 137, and the free ends of which lie one upon each side of the opening between the sides or arms of the bifurcated free end of the said arm, as will be understood from Fig. 17; so that after the button has been moved into a position over the anvil 88 and as the button is secured to the garment by the fastening staple, the button may be forced downward between the sides of the bifurcated end of the arm 100, and the said arm may move upward past the button, and the button thus freed from the jaws. The inner faces of the jaws are suitably shaped to grasp the button and hold it from turning or becoming displaced while it is being transferred to the button attaching mechanism. The free ends of said jaws are forced toward one another by means of a spring 138 and the inward movement of said free ends is limited by a ridge 139 as will be understood from Figs. 14 to 16.

The operation of my improved button attaching machine as a whole is as follows: Buttons are released by the button escapement 37 and pass one by one into the button receiving recess formed by the wall 39. The button positioning mechanism is now moved downward into engagement with the button within the receiver and the button turning member 64 thereof turns the button about its axis into such a position that the cross-bar thereof will extend in the proper direction after it has been transferred to the button attaching mechanism of the machine. The arm 100 of the button transferring mechanism is now moved into a position such that the spring-pressed jaws thereof grasp the button within the receiver, as shown in Fig. 16, after which the button positioning mechanism is moved upward and away from the button. The arm 100 is next moved about the axis of the guide 102 and the button moved into a position over the upper end of the anvil 88, as shown in Fig. 15. The arm 100 and the button setting punch 90 are next moved downward substantially in unison during which the button and garment are forced over the prongs of the fastening staple and the prongs of said staple are bent about the cross-bar of the button as shown in Fig. 18. The setting punch and arm are finally moved upward substantially in unison and the button thus freed from the holding jaws of the button transferring mechanism.

While in disclosing my improved button attaching machine I have referred to it as operating upon buttons having a cross-bar at the base, it will be obvious that the machine will operate without any change whatever upon buttons having an imperforate base; as the button positioning mechanism will then not operate upon the buttons to turn them into any definite or predetermined position, and will turn them, if at all, only because of the frictional engagement between the parts. It therefore follows that a single machine may be used to attach either imperforate base buttons or buttons having a cross-bar, the same kind of securing rivet being capable of use with both types of button.

Having thus described and explained my invention, I claim and desire to secure by Letters Patent:

1. In a button attaching machine, a button receiving member; means for supplying a button to said receiving member; button attaching mechanism located at a distance from said button receiving member; and button transferring mechanism arranged to remove the button from said button receiving member and to transfer it to said button attaching mechanism and hold the same while it is being attached by said button attaching mechanism.

2. In a button attaching machine, a button receiving member; means for supplying a button to said receiving member; button attaching mechanism located at a distance from said button receiving member; a movable member; means carried by said member and arranged to grasp the button; and means for moving said movable member to remove the button from said button receiving member and to transfer it to said button attaching mechanism and hold the same while it is being attached by said button attaching mechanism.

3. In a button attaching machine, a button receiving member; means for supplying a button to said receiving member; button attaching mechanism located at a distance from said button receiving member; an oscillating member; yielding means carried by said oscillating member and arranged to grasp the button; and means for imparting oscillating movement to said member to remove the button from said button receiving member and to transfer it to said button attaching mechanism and hold the same while it is being attached by said button attaching mechanism.

4. In a button attaching machine, a button receiving member; means for supplying a button to said receiving member; button attaching mechanism located at a distance from said button receiving member; a movable jaw carrying member; a pair of spring-pressed jaws carried by said member and arranged to grasp the button; and means for moving said jaw carrying member to remove the button from said button receiving member and to transfer it to said button attaching mechanism and hold the same while it is being attached by said button attaching mechanism.

5. In a button attaching machine, a button receiving member; means for supplying a button to said receiving member; button attaching mechanism located at a distance from said button receiving member; a jaw carrying member capable of oscillatory and of vertical movements; a pair of spring-pressed jaws carried by said member and arranged to grasp the button; means for imparting oscillatory movement to said jaw carrying member; and means for imparting vertical movement to said jaw carrying member and hold the same while it is being attached by said button attaching mechanism.

6. In a button attaching machine, a button receiving member; means for supplying a button to said receiving member; button attaching mechanism located at a distance from said button receiving member; a supporting and guide member capable of oscillatory and of vertical movements; a vertically arranged bearing in which said member operates; a jaw carrying arm at the lower end of said supporting and guide member; means for imparting oscillatory movement to said jaw carrying arm; means for imparting vertical movement to said arm; and yielding jaws carried by said jaw carrying arm and arranged to grasp a button and to transfer it from said button receiver to said button attaching mechanism and hold the same while it is being attached by said button attaching mechanism.

7. In a button attaching machine, a button receiving member; means for supplying a button to said receiving member; button attaching mechanism located at a distance from said button receiving member; a supporting and guide member capable of oscillatory and of vertical movements; a vertically arranged bearing in which said member operates; a spring adapted to hold said supporting member in its uppermost position and to yield as said member is moved downward; a lever secured to the lower end of said supporting member and having an operating arm and a jaw carrying arm; operating means connected with said operating arm and adapted to impart oscillatory movement to said lever; means for imparting vertical movement to said lever; and yielding jaws carried by said jaw carrying arm and arranged to grasp a button and to transfer it from said button receiver to said button attaching mechanism and hold the same while it is being attached by said button attaching mechanism.

8. In a button attaching machine, a button receiving member; means for supplying a button to said receiving member; button attaching mechanism located at a distance from said button receiving member; a supporting and guide member capable of oscillatory and of vertical movements; a vertically arranged bearing in which said member operates; a spring arranged to hold said supporting member in its uppermost position and to yield as said member is moved downward; a lever secured to the lower end of said supporting member and having an operating arm and a jaw carrying arm; operating means connected with said operating arm and arranged to impart oscillatory movement to said lever; a collar surrounding and movable upon said supporting and guide member; a spring interposed between said lever and said collar; a vertically movable member having an arm in operative engagement with said collar; and yielding jaws carried by said jaw carrying arm and arranged to grasp a button and to transfer it from said button receiver to said button attaching mechanism.

9. In a button attaching machine, a button receiving member; means for supplying a button to said receiving member; button attaching mechanism located at a distance from said button receiving member; a supporting and guide member capable of oscillatory and of vertical movements; a vertically arranged bearing in which said member operates; a spring arranged to hold said supporting member in its uppermost position and to yield as said member is moved downward; a lever secured to the lower end of said supporting member and having an operating arm and a jaw carrying arm; operating means connected with said operating arm and arranged to impart oscillatory movement to said lever; a vertically movable member arranged to move said supporting and guide member downward; a spring through which movement is transmitted to said supporting and guide member; and yielding jaws carried by said jaw carrying arm and adapted to grasp a button and to transfer it from said button receiver to said button attaching mechanism.

10. In a button attaching machine, a button receiving member; means for supplying buttons to said receiving member separately and in succession; means for rotating each successive button about its axis in such manner as to cause each button to assume a definite and predetermined position; button attaching mechanism located at a distance from said button receiving member; and button transferring mechanism arranged to remove the button from said button receiving member and to transfer it to said button attaching mechanism.

11. In a button attaching machine, a button receiving member; means for supplying buttons to said receiving member separately and in succession; means for rotating each successive button about its axis in such manner as to cause each button to assume a definite and predetermined position; button attaching mechanism located at a distance from said button receiving member; a movable member; means carried by said member and arranged to grasp the button; and means for moving said movable member to remove the button from said button receiving member and to transfer it to said button attaching mechanism.

12. In a button attaching machine, a button receiving member; means for supplying a button to said receiving member; means arranged to engage the button after it has been supplied to said button receiving member and to rotate it about its axis in such manner as to cause it to assume a definite and predetermined angular position; button attaching mechanism located at a distance from said button receiving member; an oscillating member; yielding means carried by said oscillating member and arranged to grasp the button; and means for imparting oscillatory movement to said member to remove the button from said button receiving member and to transfer it to said button attaching mechanism.

13. In a button attaching machine, a button receiving member; means for supplying a button to said receiving member; means arranged to engage the button after it has been supplied to said button receiving member and to rotate it about its axis in such manner as to cause it to assume a definite and predetermined angular position; button attaching mechanism located at a distance from said button receiving member; a jaw carrying member capable of oscillatory and of vertical movements; a pair of spring-pressed jaws carried by said member and arranged to grasp the button; means for imparting oscillatory movement to said jaw carrying member; and means for imparting vertical movement to said jaw carrying member.

14. In a button attaching machine, a button receiving member; means for supplying a button to said receiving member; means arranged to engage the button after it has been supplied to said button receiving member and to rotate it about its axis in such manner as to cause it to assume a definite and predetermined angular position; button attaching mechanism located at a distance from said button receiving member; a supporting and guide member capable of oscillatory and of vertical movements; a vertically arranged bearing in which said member operates; a jaw carrying arm at the lower end of said supporting and guide member; means for imparting oscillatory movement to said jaw carrying arm; means for imparting vertical movement to said arm; and yielding jaws carried by said jaw carrying arm and arranged to grasp a button and to transfer it from said button receiver to said button attaching mechanism.

15. In a button attaching machine, a button receiving member; means for supplying a button to said receiving member; means arranged to engage the button after it has been supplied to said button receiving member and to rotate it about its axis in such manner as to cause it to assume a definite and predetermined angular position; button attaching mechanism located at a distance from said button receiving member; a supporting and guide member capable of oscillatory and of vertical movements; a vertically arranged bearing in which said member operates; a spring arranged to hold said supporting member in its uppermost position and to yield as said member is moved downward; a lever secured to the lower end of said supporting member and having an operating arm and a jaw carrying arm; operating means connected with said operating arm and arranged to impart oscillatory movement to said lever; means for imparting vertical movement to said lever; and yielding jaws carried by said jaw carrying arm and arranged to grasp a button and to transfer it from said button receiver to said button attaching mechanism.

16. In a button attaching machine, a button receiving member; means for supplying buttons to said receiving member separately and in succession; means arranged to engage each separate button after it has been supplied to said button receiving member and to rotate it about its axis in such manner as to cause each button to assume a definite and predetermined position; button attaching mechanism located at a distance from said button receiving member; and button transferring mechanism arranged to remove the button from said button receiving member and to transfer it to said button attaching member.

17. In a button attaching machine, a button receiving member; means for supplying a button to said receiving member; a reciprocating and oscillating button turning member the lower end of which is arranged to engage and rotate the button within said button receiving member; means for moving said turning member downward to cause its lower end to engage the button; means for imparting rotary motion to said turning member to rotate the button about its axis into a definite predetermined position; button attaching mechanism located at a distance from said button receiving member; and button transferring mechanism arranged to remove the button from said button receiving member and to transfer it to said button attaching mechanism.

18. In a button attaching machine, a button receiving member; means for supplying a button to said receiving member; a reciprocating and oscillating button turning member, the lower end of which is arranged to engage and rotate the button within said button receiving member; means for moving said turning member downward to cause its lower end to engage the button; means for imparting rotary motion to said turning member to rotate the button about its axis into a definite predetermined position; a movable member; means carried by said member and arranged to grasp the button; and means for moving said movable member to remove the button from said button receiving member and to transfer it to said button attaching mechanism.

19. In a button attaching machine, a button receiving member; means for supplying a button to said receiving member; a reciprocating and oscillating button turning member the lower end of which is arranged to engage and rotate the button within said button receiving member; means for moving said turning member downward to cause its lower end to engage the button; means for imparting rotary motion to said turning member to rotate the button about its axis into a definite predetermined position; an oscillating member; yielding means carried by said oscillating member and arranged to grasp the button; and means for imparting oscillatory movement to said member to remove the button from said button receiving member and to transfer it to said button attaching mechanism.

20. In a button attaching machine, a button receiving member; means for supplying a button to said receiving member; a reciprocating and oscillating button turning member the lower end of which is arranged to engage and rotate the button within said button receiving member; means for moving said turning member downward to cause its lower end to engage the button; means for imparting rotary motion to said turning member to rotate the button about its axis into a definite predetermined position; a movable jaw carrying member; a pair of spring-pressed jaws carried by said member and arranged to grasp the button; and means for moving said jaw carrying member to remove the button from said button receiving member and to transfer it to said button attaching mechanism.

21. In a button attaching machine, a button receiving member; means for supplying a button to said receiving member; a reciprocating and oscillating sleeve member; a yieldable button turning member carried by and partaking of the movements of said sleeve member, and the lower end of which is adapted to engage and rotate the button within said button receiving member; means for imparting reciprocating motion to said sleeve; means for imparting rotary motion to said sleeve; button attaching mechanism located at a distance from said button receiving member; and button transferring mechanism arranged to remove the button from said button receiving member and to transfer it to said button attaching mechanism.

22. In a button attaching machine, a button receiving member; means for supplying a button to said receiving member; a reciprocating and oscillating sleeve member; a yieldable button turning member carried by and partaking of the movements of said sleeve member, and the lower end of which is adapted to engage and rotate the button within said button receiving member; means for imparting reciprocating motion to said sleeve; means for imparting rotary motion to said sleeve; a yieldable button steadying sleeve surrounding said button turning member and the lower end of which is adapted to engage the button, and which sleeve partakes of the reciprocating movements of said first mentioned sleeve member; button attaching mechanism located at a distance from said button receiving member; and button transferring mechanism arranged to remove the button from said button receiving member and to transfer it to said button attaching mechanism.

23. In a button attaching machine, a button receiving member; means for supplying a button to said receiving member; a reciprocating and oscillating sleeve member; a yieldable button turning member carried by and partaking of the movements of said sleeve member, and the lower end of which is adapted to engage and rotate the button within said button receiving member; means for imparting reciprocating motion to said sleeve ; means for imparting rotary motion to said sleeve; a yieldable button steadying sleeve surrounding said button turning member, the lower end of which sleeve is adapted to engage the button; means whereby reciprocating motion is communicated to said button steadying sleeve from said first mentioned sleeve member; means for preventing said button steadying sleeve from turning; button attaching mechanism located at a distance from said button receiving member; and button transferring mechanism arranged to remove the button from said button receiving member and to transfer it to said button attaching mechanism.

24. In a button attaching machine, a button receiving member; means for supplying a button to said receiving member; a reciprocating and oscillating sleeve member having an elongated pinion; a yieldable button turning member carried by and partaking of the movements of said sleeve member, and the lower end of which is adapted to engage and rotate the button within said button receiving member; an oscillating lever one end of which is operatively connected with said sleeve member to thereby impart reciprocating motion thereto; an oscillating toothed sector in operative engagement with the pinion aforesaid; button attaching mechanism located at a distance from said button receiving member; and button transferring mechanism arranged to remove the button from said button receiving member and to transfer it to said button attaching mechanism.

25. In a button attaching machine, a button receiving member; means for supplying a button to said receiving member; a reciprocating and oscillating sleeve member having an elongated pinion formed in its periphery, and a circumferentially extending groove adjacent its upper end; a yieldable button turning member carried by and partaking of the movements of said sleeve, and the lower end of which is adapted to engage and rotate the button within said button receiving member; an oscillating lever one end of which is provided with pins extending into the groove aforesaid; an oscillating toothed sector in operative engagement with the pinion aforesaid; button attaching mechanism located at a distance from said button receiving member; and button transferring mechanism arranged to remove the button from said button receiving member and to transfer it to said button attaching mechanism.

Signed at Waterbury in the county of New Haven and State of Connecticut this seventh day of May A. D. 1913.

FRANKLIN R. WHITE.

Witnesses:
EDNA M. HEALEY,
KATHARINE A. RUBEY.